(12) United States Patent
Kunieda et al.

(10) Patent No.: US 6,661,439 B1
(45) Date of Patent: Dec. 9, 2003

(54) INFORMATION VISUALIZATION SYSTEM

(75) Inventors: Kazuo Kunieda, Tokyo (JP); Masaki Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 470 days.

(21) Appl. No.: 09/670,104

(22) Filed: Sep. 26, 2000

(51) Int. Cl.[7] ................................................ G06F 3/00
(52) U.S. Cl. ...................... 345/850; 345/848; 345/757; 345/760
(58) Field of Search ................................ 345/419, 427, 345/848, 850, 751, 757, 760; 715/513

(56) References Cited

U.S. PATENT DOCUMENTS

| | | | | |
|---|---|---|---|---|
| 5,566,294 A | * | 10/1996 | Kojima et al. | 345/866 |
| 5,790,950 A | * | 8/1998 | Suzuki et al. | 435/427 |
| 5,929,861 A | * | 7/1999 | Small | 345/427 |
| 5,956,028 A | * | 9/1999 | Matsui et al. | 345/757 |
| 6,023,714 A | * | 2/2000 | Hill et al. | 715/513 |
| 6,351,321 B1 | * | 2/2002 | McIntyre | 358/450 |
| 6,480,191 B1 | * | 11/2002 | Balabanovic | 345/419 |

FOREIGN PATENT DOCUMENTS

| | | |
|---|---|---|
| JP | 06-149933 | 5/1994 |
| JP | 08-083197 | 3/1996 |
| JP | 10-011247 | 1/1998 |
| JP | 10-107794 | 4/1998 |
| JP | 10-214069 A | 8/1998 |

OTHER PUBLICATIONS

Kihara, Tamio and Nakakura, Kazuaki, NTT Gijutsu Janaru, Denki Tsushin Kyokai, published Feb. 1, 1999, vol. 11, No. 2, p. 136–137.

* cited by examiner

*Primary Examiner*—John Cabeca
*Assistant Examiner*—Kieu D. Vu
(74) *Attorney, Agent, or Firm*—Foley & Lardner

(57) ABSTRACT

An information visualization system allows carrying out a three-dimensional walk through and hyperlink operation with little processing and allows automatically incorporating modifications into the image. A partial image generating device that forms the information visualization system generates a walk through image from three-dimensional space shape information and walk through path information, and converts same into a plurality of partial images that are partitioned at branching points. A branching information generating device generates branching information for the partial images. A hyperlink information generating device generates hyperlink information based on the visualized object information in the three-dimensional space. A partial image selection device sends a partial image switching instruction in order to switch partial images depending on the path selection of the user. A partial image link play device sends a partial image selection instruction depending on the partial image switching instruction, and at the same time smoothly links and plays the switched partial images.

2 Claims, 8 Drawing Sheets

FIG. 2

103 VISUALIZED OBJECT INFORMATION

| VISUALIZED OBJECT NAME | THREE-DIMENSIONAL SHAPE MODEL | THREE-DIMENSIONAL COORDINATES | ASSOCIATED INFORMATION LINK |
|---|---|---|---|
| House#2 | /data/house2.wrl | (10, 0, 20) | ABSENT |
| Bird#1 | /data/bird1.wrl | (10, 20, 30) | BIRD.TEXT |
| ...... | ...... | ...... | ...... |

FIG. 3

113 HYPERLINK INFORMATION

| VISUALIZED OBJECT NAME | PARTIAL IMAGE NUMBER | STARTING POINT COORDINATE | ENDING POINT COORDINATE | STARTING FRAME | ENDING FRAME | ASSOCIATED INFORMATION LINK |
|---|---|---|---|---|---|---|
| Bird#1 | SEGMENT 1 | (100,150)-(180,200) | (150,150)-(230,200) | 100 | 200 | BIRD.TEXT |
| ....... | ....... | ....... | ....... | ....... | ....... | ....... |

FIG. 4

111 BRANCHING INFORMATION

| PARTIAL IMAGE NUMBER | STARTING POINT COORDINATES | ENDING POINT COORDINATES | STARTING FRAME | ENDING FRAME | CONNECTION DESTINATION PARTIAL IMAGE NUMBER |
|---|---|---|---|---|---|
| SEGMENT 1 | (10,10)-(400,700) | (110,10)-(500,700) | 300 | 400 | SEGMENT 10 |
| SEGMENT 1 | (600,10)-(900,700) | (700,110)-(1000,710) | 550 | 650 | SEGMENT 20 |
| ...... | ...... | ...... | ...... | ...... | ...... |

FIG. 6

POINT INFORMATION TABLE

| POINT NUMBER | X-COORDINATE | Y-COORDINATE | Z-COORDINATE |
|---|---|---|---|
| P1 | 10 | 0 | 0 |
| P2 | 10 | 0 | 10 |
| P3 | 10 | 0 | 20 |
| P4 | 10 | 0 | 30 |
| P5 | 0 | 0 | 20 |
| P6 | 20 | 0 | 27 |
| ...... | ...... | ...... | ...... |

PATH INFORMATION TABLE

| PATH NAME | PATH INFORMATION |
|---|---|
| SEGMENT 1 | P1→P2→P3→P4 |
| SEGMENT 10 | P2→P5 |
| SEGMENT 20 | P3→P6 |
| ...... | ...... |

31: DISPLAY SCREEN
32: THREE-DIMENSIONAL SPACE

41: BRANCHING PATH SELECTION AREA

32: THREE-DIMENSIONAL SPACE
31: DISPLAY SCREEN

41: BRANCHING PATH SELECTION AREA

INFORMATION VISUALIZATION SYSTEM

BACKGROUND ART

1. Field of the Invention

The present invention relates to an information visualization system that can carry out information display and provide a three-dimensional walk through to a user with little processing by embedding various types of information as visual objects at the desired positions in an image of space generated virtually by a computer.

2. Description of the Prior Art

Conventionally, starting with the Information Processing Committee Study Report 96-IM-28-7, among information visualization systems that use a computer, there are information visualization systems that provide an architecture for an information presentation environment by embedding as visual objects various types of information (contents) at desired positions in three-dimensional computer graphics (three-dimensional CG) image generated by a computer.

Using these systems, users carry out an operation in which a virtual viewpoint varies within an image of a three-dimensional space in this information display environment and an operation in which the visualized objects are selected and moved in this information display environment. Thereby, the users can display a visualized object in a sequence of images and they can selectively obtain the information embedded there.

Furthermore, many systems have been realized in which the information related to the visualized information is displayed to the user (if the image is a book, for example, its bibliographic information or a list of books by the same author), and formats for an additional display of the related information by directly selecting one of the visualized objects on the screen by pointing, for example, and formats for the additional display of the related information using an icon or menu selection on a screen are generally widely used.

In these systems, the walk through interface, wherein users can search for information as if they were walking, is intuitively superior and widely used as an interface wherein the users move a virtual viewpoint within an image of a three-dimensional space.

In particular, a format in which the users can freely determine the direction of movement of the virtual viewpoint at any given time and the system can display each of the images of a space depending on this determination is advantageous because the users can carry out a desired search by performing a walk through as they please.

However, in order to generate these walk through images, high capacity three-dimensional CG computations must be carried out and, for example, hardware dedicated to the three-dimensional CG processing is necessary for generating the walk through images in real time as directed by the operations of the users. The above will be referred to as the first conventional technology.

In contrast, a method that uses movie files, starting with the QuickTime VR from Apple Corporation, is well known as a method that makes possible the above information visualization without using hardware dedicated to three-dimensional CG.

According to this conventional technology, users, for example, generate as a movie file the images of the path anticipated in advance that the user will walk through, and the walk through images can be presented in real time to the user by playing the movie file.

Here, when generating the movie file, high volume processing like the above-described three-dimensional CG processing is necessary, but once the movie film is generated, playing the movie subsequently using relatively little processing can be realized. Furthermore, in this method, in the film file the images of a plurality of paths are embedded, and the users can selectively play them. This means that while the users are not completely free, to a certain extent, they can perform the walk through as they please. This will be referred to as the second conventional technology.

In addition, independent of these, a format proposed at the Information Processing Committee $49^{th}$ National Conference, Proceedings 1 W-7, is known. This format generates what is called hyperlink information for managing the association between the objects displayed in each scene of a movie file and the related information stored separately, and in the case that a predetermined position in a predetermined scene in the movie file is selected, the information related to this is called and displayed.

By using this technology, the users select particular objects displayed in the image of the space while performing a walk through using the movie files, and thereby can obtain information related thereto. In this manner, what is termed a hyperlink interface can be realized. This will be referred to as the third conventional technology.

However, these conventional technologies have the following problems. Specifically, according to the second conventional technology starting with QuickTime VR, various types of information embedded in the images of space can be obtained while selectively performing a walk through along a plurality of paths determined in advance, but in order to generate these walk through images, the associations between these movie files must be made by manual operations after generating the movie file for each of the paths.

Furthermore, in order to generate in a form that finally joins into one file the information that establishes the relationships between movie files and the plurality of movie files, in the case small-scale modifications, such as adding and partially modifying walk through paths, the entire movie file must be regenerated, and further, this operation must be carried out using manual operations, as described above. Thus, in the format according to the second conventional technology, when first generating the movie file and when associating movie files, there is the problem that many manual operations are necessary when regenerating the walk through images to incorporate additional modifications in the case that there are additional modifications to the walk through path are made later.

Furthermore, according to the third conventional technology, in each of the scenes of the movie file of the walk through image, the contents displayed therein and the authoring of the hyperlink information with related information must be carried out manually, and thus many manual operations must be added when generating this hyperlink information. Also, when the contents of the virtual space and the hyperlink information are modified after generation of the movie file, there is the second problem that an image of a space that automatically incorporates these modifications cannot be displayed to the user.

SUMMARY OF THE INVENTION

In consideration of the above-described problems, the present invention has as a first object providing a system realizing an information visualization system that allows the user to walk through a plurality of paths in a three-dimensional space selectively without using hardware dedicated to three-dimensional CG, and in the case that the three-dimensional space information, the walk through paths, and the like have been modified, automatically incorporates these modifications in the walk through images.

The present invention has as a second object automatically generating hyperlinks between contents displayed therein and the related information in each scene of the walk through image in the information visualization system.

As a means of resolving the first problem, the information visualization system according to the present invention comprises a partial image generating means that generates three-dimensional CG images along a walk through path based on walk through path information that includes three-dimensional space information and branching information, converts these three-dimensional CG images into walk through movie images having a movie format, and further partitions these walk through images at the branching points of the walk through path, and generates a plurality of partial images in a movie format; a branching information generating means that generates branching information related to the branch connections (positional relations on the walk through path) between each partial image generated by this partial image generating means; a branching information storing means that temporarily stores the branching information generated by this branching information generating means; a partial image storing means that temporarily stores the partial image generated by the partial image generating means and sends predetermined partial images depending on the partial image selection instructions sent by the partial image link play means described below; a partial image selection means that sends partial image switching instructions for switching partial images stored in this partial image storing means according to the path selection operation of the user; and a partial image link play means that sends these partial image selection instructions according to the partial image switching instructions that this partial image selection means sends, and at the same time, links and plays the predetermined partial images.

The above-described structure is characterized by the point that the users are able to perform a selective walk through using partial images having a movie format generated automatically from three-dimensional space information and information about the walk through paths. In addition, even in the case that the three-dimensional space information and the walk through paths are modified, this structure is characterized in allowing these modifications to be automatically incorporated therein.

Furthermore, this structure is characterized by the point that because the walk through movie is used after being partitioned into partial images, only partial images related to any modifications are regenerated, not all partial images, in the case that the three-dimensional space information and the walk through paths are modified.

Moreover, the three-dimensional CG processing in the above-described branching information generating means does not have to be carried out in real time because the this processing is carried out in advance, unrelated to the operations of the user. Thus, the present invention can be effectively implemented without using hardware dedicated to three-dimensional CG processing.

This means that the walk through can be realized without using hardware dedicated to three-dimensional CG, and the number of operations during the walk through image generation and during image updating can be dramatically decreased in comparison to the above-described second conventional technology.

As a means for resolving the above-described second problem, the information visualization system according to the present invention adds to the means for resolving the above-described first problem a hyperlink information generating means that displays the contents (visualized object) at a certain position in a certain scene in the respective partial images based on three-dimensional shape information about the contents (visualized object) visualized in a three-dimensional space, three-dimensional position information, and link information for the related information of the contents (visualized object), and furthermore, generates hyperlink information indicating the position of the related information to be presented to the user when the user selects the contents images (visualized object).

The above-described structure can provide to the users a hyperlink function that can present to the users contents (linked information) linked to the selected visualized object by selecting the visualized object displayed on the screen while a user is performing a selective walk through, and furthermore, can automatically generate hyperlink information for the hyperlink function from the three-dimensional space information, the walk through path information, and the visualized object information.

Therefore, the number of operations necessary to generate the hyperlink information can be dramatically decreased in comparison to the above-described third conventional technology. Furthermore, the images of the space can be presented to the user automatically incorporating updates thereof even in the case that the contents of the virtual space and the hyperlink information are modified after the movie file is generated.

BRIEF DESCRIPTION OF THE DRAWINGS

FIG. 2 is an explanatory drawing of the visualized object information.

FIG. 3 is an explanatory drawing of the hyperlink information.

FIG. 4 is an explanatory drawing of the branching information.

FIG. 6 is an explanatory drawing of the path information.

DETAILED DESCRIPTION OF THE INVENTION

Figure 1:
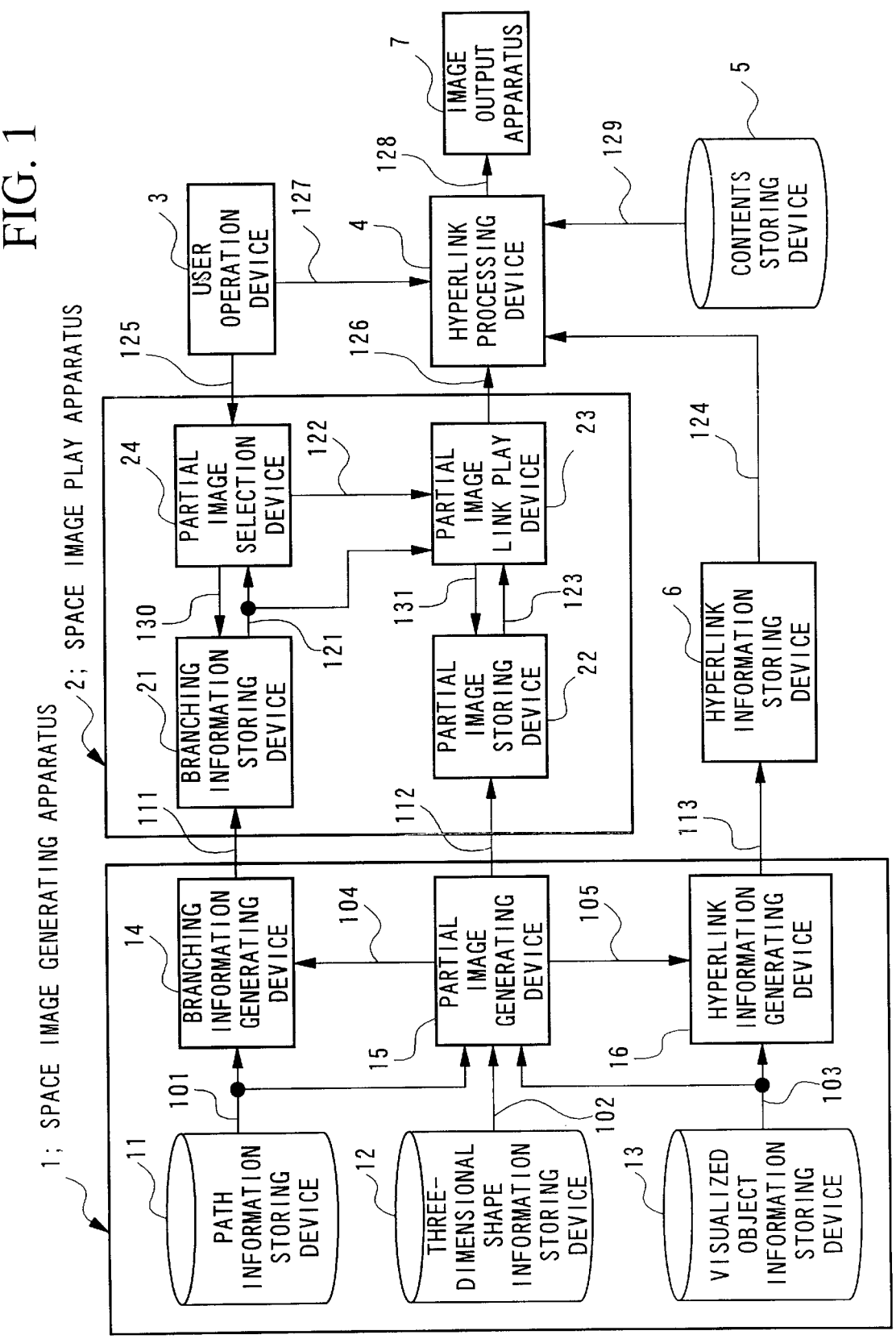
FIG. 1 is a structural drawing of the information visualization system according to the present invention.

FIG. 1 is a structural drawing for explaining the information visualization system according to the present invention. This information visualization system comprises a space image generating apparatus 1, a space image play apparatus 2, a contents storing means 5 that stores various types of related information, a hyperlink information storing means 6 that temporarily stores the hyperlink information 113 generated by the space image generating apparatus 1 and sends this as hyperlink information 124 as necessary, a hyperlink processing means 4 that carries out hyperlink processing, synthesizes the images of the related information 129 in the space image 126, and sends the resulting image as an output image 128, an image output apparatus 7 that displays the output image 128, and a user operation means 3 that inputs the operations of the user.

The space image generating apparatus 1 comprises a path information storing apparatus 11 that stores path information 101 of the walk through, a three-dimensional image shape information storing means 12 that stores the three-dimensional space shape information 102, a visualized object information storing means 13 that stores the visualized object information 103, a partial image generating means 15 that generates an image of a space using three-dimensional CG from the three-dimensional space shape information 102 and visualized object information 103, and at the same time, outputs a partial image of the space for each path between branching points based on the path information 101 of the walk through as a partial image 112, a branching information generating means 14 that generates branching information 111 for managing the correspondences between the frame number information 104 and the path information of each branching point in the generated partial image, and a hyperlink information generating means 16 that generates as hyperlink information 113 a correspondence between the two-dimensional position information on the screen in the case that a visualized object is displayed in the partial image and the temporal position information of the image at that point in time based on the position information of the visualized object in three-dimensional space included in the visualized object information 103.

The space image play apparatus 2 comprises a branching information storing means 21 that temporarily stores the branching information 111 and output is a brand information instruction 121, a partial image selection means 24 that sends a partial image switching instruction 122 for switching the partitioned and stored partial images depending on the path selection operation of a user, a partial image storing means 22 that temporarily stores a plurality of partial images 112 and sends the partial image 123 as instructed based on the partial image selection instruction 131, and a partial image link play means 23 that sends a partial image selection instruction 131 depending the partial image switching instruction 122, and at the same time, smoothly links an plays the switched partial image as space image 126.

Figure 5:
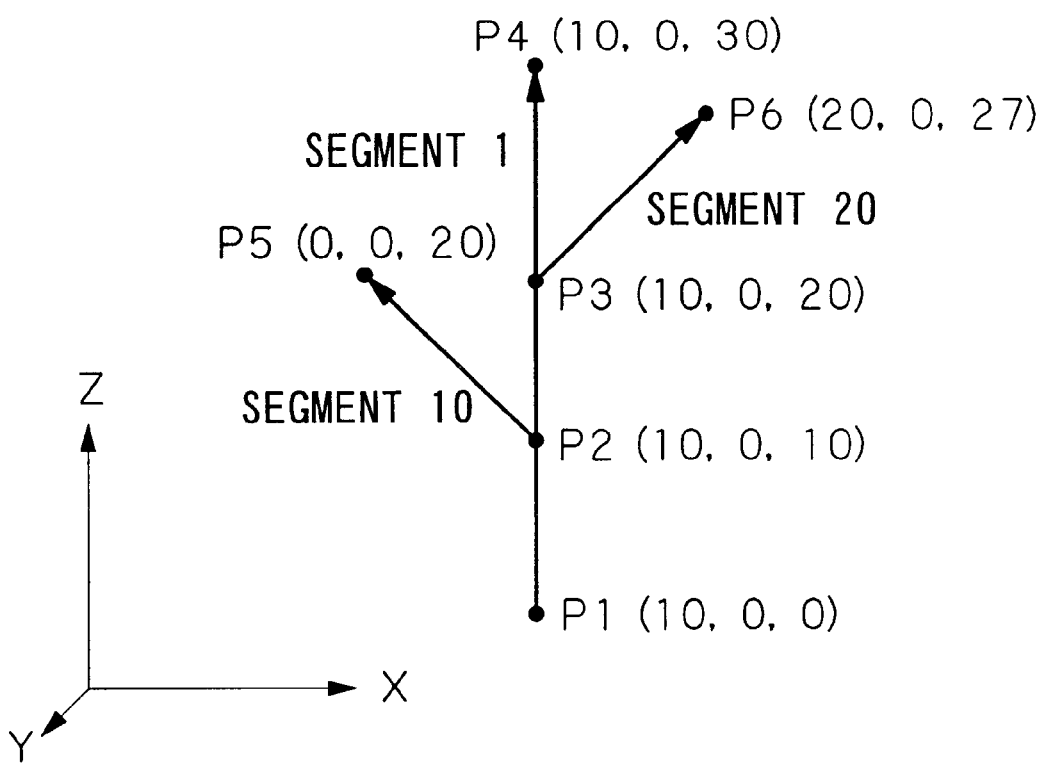
FIG. 5 is an explanatory drawing of the paths.

The path information storing means 11 and the path information 101 will be explained referring to FIG. 1, FIG. 5, and FIG. 6. FIG. 5 is a drawing for explaining the movement path of the viewpoint in three-dimensional space. Here, point P1 in the three-dimensional space serves as a starting point, a movement path that branches at points P2 and P3 is shown, and the three-dimensional coordinated values of the corresponding points are in the brackets in the figure. At this time, in order to represent this type of movement path, the path information 101 stored in the path information storing means 11 is realized by the point information table and the path information table shown in FIG. 6. The point information table stores the three-dimensional coordinate values corresponding to the respective point numbers, and the path information table represents the information for each path that is segmented by the branching point using the point numbers. For example, segment 1 is a path that passes in sequence each of the points P1→P2→P3→P4, and segment 10 is the path of P2→P5, which branches from segment 1 at point P2. Here, each of the segmented paths is called a partial path.

Next, the visualized object information storing means 13 and the visualized object information 103 are explained referring to FIG. 1 and FIG. 2. Here, a visualized object denotes visually representing the visualized object information in three-dimensional space, and the case of the visualized object information serving directly as the visualized object and the case of a three-dimensional object symbolically representing the visualized object information serving as the visualized object can be considered.

If the information for the visualized object is, for example, three-dimensional shape information, it is most effective to use this directly as the visualized object in the three-dimensional space, and if the visualized object information is, for example, text information, it is most effective to use a three-dimensional object (for example, a three-dimensional model of a bookshelf) symbolically representing this as the visualized object, which is arranged in a three-dimensional space.

FIG. 2 is an example of the visualized object information 103 managed in the visualized object information storing means 13. The visualized object information 103 comprises a visualized object name for uniformly identifying the visualized objects, a three-dimensional shape model that indicates the file storing the three-dimensional shape information for the visualized object, three-dimensional coordinates that indicate the position of the visualized object in three-dimensional space, and link information to the related information that is related with the visualized object.

Here, the related information link denotes a means for referring to information A in the case that the visualized object is symbolically representing information A, or information necessary to refer to information A, for example, the 'storage location of information A. For example, in FIG. 2, the visualized object "Bird#1" can be thought of as symbolically representing "bird.txt", which is the information for the visualized object, in the three-dimensional space (10, 20, 30).

Moreover, the related information link is not limited to that described above, but irrespective of whether the visualized object directly represents or symbolically represents the visualized object information, stores the link to information having any sort of relation to this information as a link to related information in a broad sense.

Next, the branch information generating means 14, the partial image generating means 15, and the hyperlink information generating means 16 will be explained referring to FIG. 1, FIG. 7, and FIG. 8. Here, the term "frame" as used below denotes each still image when the image is treated as a sequence of still images, and "frame number" denotes the number of the frame from the head of the image.

First, in the partial image generating means, the walk through images that cover the path indicated by the path information 101 are generated using the conventional three-dimensional CG technology based on the visualized object information 103, the three-dimensional space shape information 102, and the path information 101. Here, the generated walk through images are images generated as the result of carrying out rendering processing in three-dimensional CG technology for each frame. In the partial image generating means 15, the images are generated and simultaneously converted to the movie format (for example, AVI format offered by Microsoft Corporation) image by image. The converted images are called a walk through movie.

Furthermore, in the partial image generating means, the walk through movie is partitioned into a plurality of movies matching each partial path based on the partition information of the walk through path obtained from the path information 101. This portioned movie is sent as a partial image 112. This means that the image of walking through one partial path is sent as one partial image.

For example, for the path information shown in FIG. 5 and FIG. 6, partial images for the respective segment 1, segment 10, and segment 20 are generated and sent.

Figure 7:
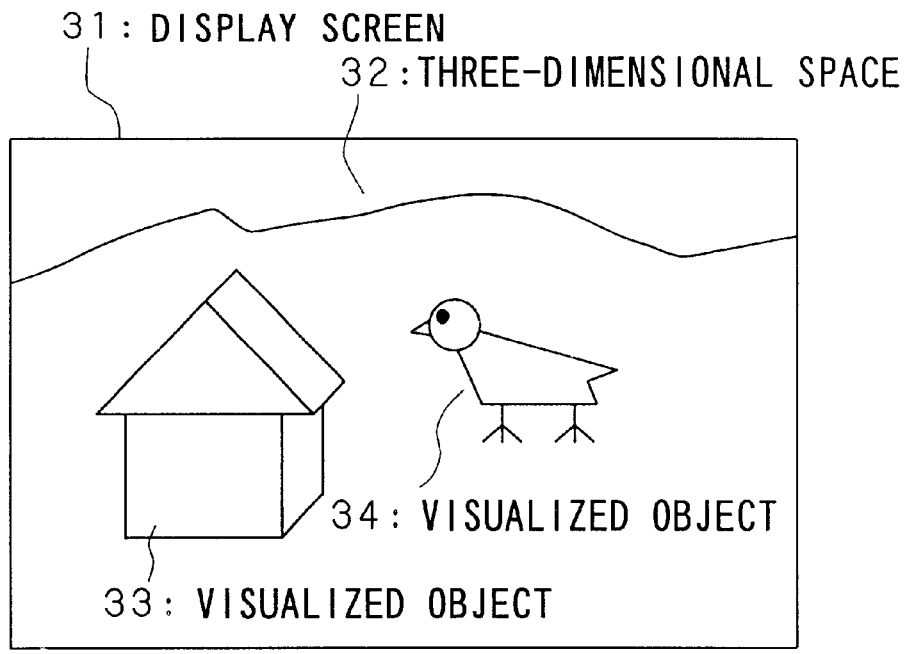
FIG. 7 is an explanatory drawing of an image of a three-dimensional space.
Figure 8:
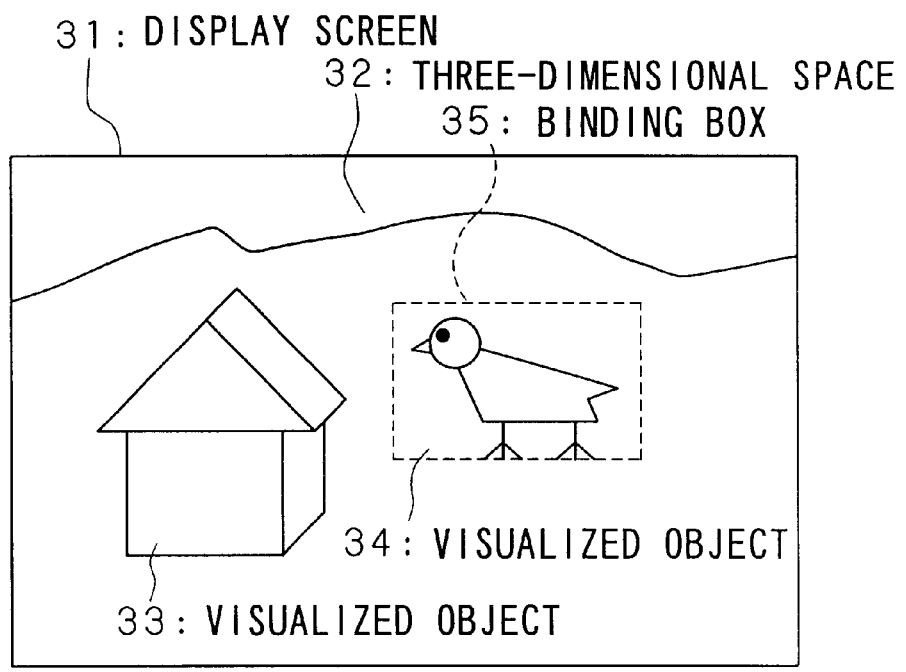
FIG. 8 is an explanatory drawing of a visualized object and a bounding box.

In addition, for example, FIG. 7 shows one scene of a partial image in the case that the visualized object information is defined as shown in FIG. 2. In the example shown in FIG. 7, an image of a three-dimensional space 32 having embedded a visualized object corresponding to House#2 and a visualized object corresponding to Bird#is displayed on the display screen 31.

The branching information generating means 14 generates-receives the frame number information 104 the partial image generating means 15 described above and generates the branching information 111 using the path information 101.

Here, if the user carries out any sort of path selection operation when any frame of any partial image is generated, the branching information 111 is the information for managing which path to branch to next, and in addition, in the present embodiment, when an image is close to a branching point, the selection of whether or not to branch is carried out depending on whether or not the user points to an area on the screen corresponding to a branching direction.

Here, the area corresponding to the branching direction on the screen is called the branching path selection area. In the case that, for example, there is a branching path present to the left, setting the area of the branching path selection area in the left half of the screen can be considered.

Moreover, the present invention is not limited to a method of "selecting whether or not to branch", but in addition, the present invention can be presented by the operator to the user using any available means, such as the method of branching by pressing a key related in advance with a branching direction using a keyboard, or a method in which the user indicates "right" and "left" by voice.

In addition, for the implementing method wherein the branching path selection area is set by pointing mentioned above when using a method of "selecting whether or not to branch", in a method in which the user is naturally aware of the related branching direction, the size and shape of the area do not matter. Furthermore, the operator can use any available method as the method wherein the presence of a branching path selection area is displayed to a user, such as a method of visually presenting an arrow, a method of presenting characters, a method of presenting the shape of the area as-is, the method of acoustical presentation using the orientation direction of sound, a method of announcing "right" and "left" by voice, etc.

Next, the embodiment of the branching information 111 is explained referring to FIG. 4. In FIG. 4, branching points are respectively related to the information for each row, and the partial image number is the designation of the partial image that includes the image at the corresponding branching point, the starting point coordinates are the position information on the screen when a branching path selection area related to a corresponding branching point first appears on the screen (in this example, the combination of the upper left coordinates and the lower right coordinates of the rectangular area indicting the branching path selection area); the ending point coordinates are the position information on the screen when the branching path selection area related to a corresponding branching point last appears on the screen (that is just before its disappearance; in this example, the combination of the upper left coordinates and the lower right coordinates of the rectangular area indicating the branching path selection area); the starting frame is the frame number of the image at the point in time the branching path selection area first appears; the ending frame is the frame number of the image at the point in time the branching path selection area last appears Oust before disappearing), and the connection destination partial image number is the image number information indicating the partial image corresponding to the path ahead of the branching point.

The information in the first line of FIG. 4 is the information relating to the point that branches from segment 1 to segment 10, and shows that the branching path selection area that first appears is the area having the upper left coordinates (10, 10) and the lower right coordinates (400, 700) of frame number 300, and the branching path selection area just before disappearance is the area having the upper left coordinates (110, 10) and the lower right coordinates (500, 700) of frame number 400.

In the present embodiment, the branching path selection area in the frames between the starting frame and ending frame can be suitably calculated from the values of the upper right coordinates and the lower left coordinates of the starting frame and the ending frame in the space image play apparatus 2 described below. For example, there is a method in which each coordinate value of the starting frame and ending frame is equally divided by the number of frames therebetween.

In addition, as a different embodiment, the above calculation can be carried out in the branching information generating means 14, and the coordinate values of the branching path selection area of each generated frame can be included in the branching information 111.

Next, the processing for generating the branching information 111 in the branching information generating means 14 will be explained referring to FIG. 5 and FIG. 10. The branching information generating means 14 receives the path information shown in FIG. 5 and the frame number information 104 from the partial image generating means. Here, the frame number information 104 is the frame number of the image at the point in time corresponding to each branching point in the partial image.

For example, taking the partial image of segment 1 in FIG. 5 as an example, the frame number information 104 is the frame number at the point in time representing the images at P1, P2, P3, and P4. Here, although in the figure P1 and P4 are not shown here as branching points, they could be considered to be branching points whose connections to other paths are not illustrated. In addition, the frame number information obtained here indicates the frame number at the point in time just after each branching point has been passed, and this value serves as the ending frame information of the branching information 111 in FIG. 4.

Next, the user should select whether or not to branch from a point at a constant distance before arriving at each branching point. For example, in the case of displaying the partial image of segment 1 as shown in FIG. 10, in the segment P1'→P2, where P1', which is the point just before arriving at P2 from P1, has been passed, the user considers selecting whether or not to branch to segment 10. Thus, the frame number of the point at a constant distance before each branching point is calculated as the starting frame information for the branching information in FIG. 4. In the example, in FIG. 10, the frame number at each of the points P1' and P2' The size of the distance at this time can be appropriately determined when implementing the present method. For the starting point coordinates and the ending point coordinates of the branching path selection area, it is effective to calculate the direction of the branching path for the partial image presently shown based on the path information and, depending on this result, to set the branching path selection area at a position on the screen.

The branching information generating means 14 generates-receives the frame number information 104 the partial image generating means 15 described above and generates the branching information 111 using the path information 101.

Figure 9A:
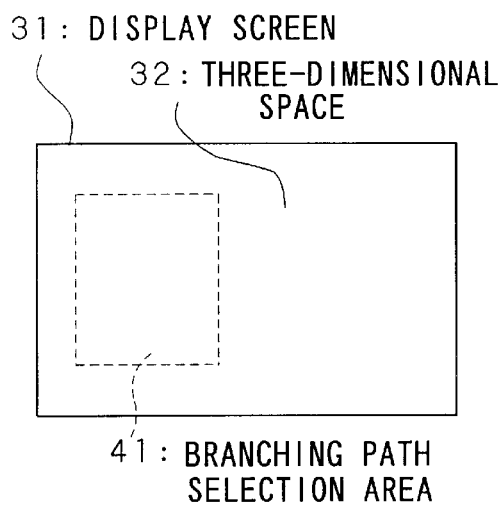
FIG. 9 is an explanatory drawing of the branch path selection area.
Figure 9B:
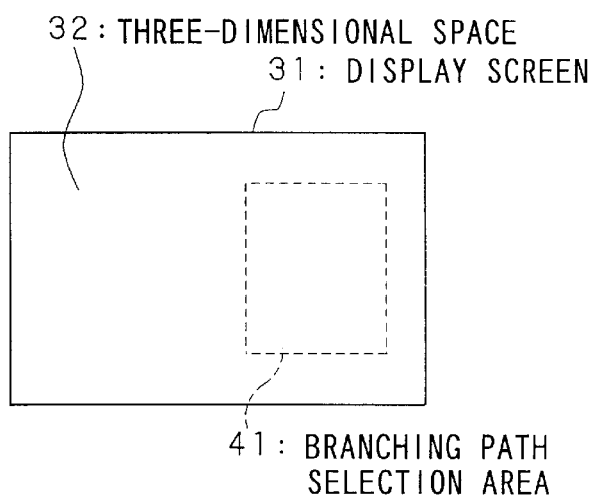
Figure 10:
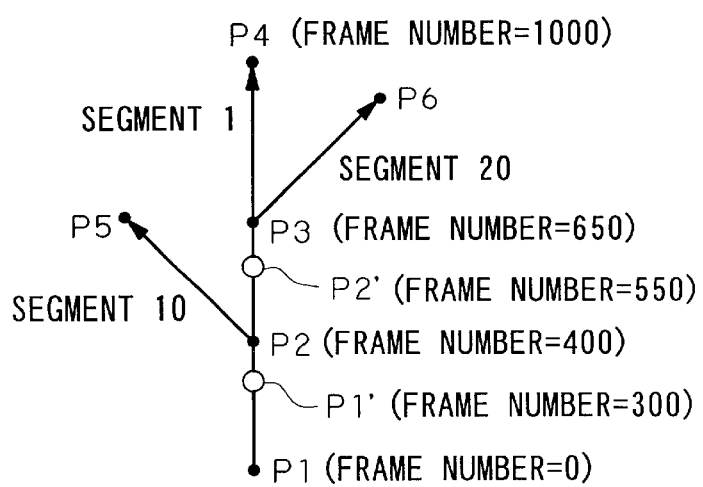
FIG. 10 is an explanatory drawing of the branching point and frame number.

For example, in the segment of P1'→P2 in FIG. 10, it is effective to set the branching path selection area to the upper left of the screen, as shown in FIG. 9(*a*), and in the segment of P2'→P3 in FIG. 10, it is effective to set the branching path selection area to the upper right of the screen as shown in FIG. 9(*b*). Here, as methods of calculating each coordinate, a method that determines in advance the coordinates of the branching path selection area depending on whether the branching direction is right or left, a method that calculates the angle to a branching destination path from the path information and sets the branching path selection area depending on the result, and a method that sets an appropriate target point on the branching destination path and sets the branching path selection area so as to be centered at this point on the screen can be considered. For these methods, as described below, if the user is naturally aware of the correspondence with the branching direction, the details do riot matter.

Next, the hyperlink information generating means 16 generates the hyperlink information 113 using the visualized object information 103 and the visualized object selection area information 105 generated in the partial image generating means 15 described above. Here, hyperlink information denotes information indicating the presence of the visualized object in any area on the screen when any frame of any partial image is generated, and furthermore, related information that is referred to when this visualized object is selected, that is, information related to the link prior to the hyperlink, is also included.

Moreover, here the area corresponding to the display position of the visualized object on the screen is called the visualized object selection area, and the related information corresponding to the visualized object is presented to the user by selecting the visualized object selection area by the user performing the appropriate operations (for example, operating a pointer with a mouse). Here, the visualized object selection area can be an area like the binding box 35 for the visualized object 34 in FIG. 8, or can be set according to whether or not the visualized object is displayed by the pixel unit (that is, the area conforming to the shape of the visualized object).

FIG. 3 shows an example of the hyperlink information 113. In FIG. 3, the visualized object name is the information designating the corresponding visualized object; the partial image number is the information designating the partial image that displays the visualized object; the starting frame is the frame number at the point in time that the visualized object first appears on the screen; the ending frame is the frame number at the point in time that the visualized object last appears Oust before disappearing) on the screen, the starting point coordinates are the position information for the visualized object selection area at the point in time of the starting frame, the ending point coordinates are the position information of the visualized object selection area at the point in time of the ending frame, and the connection information link is the link information to the related information related to the visualized object.

The example in FIG. 3 shows that the link destination of the related information for the visualized object Bird#1 in the partial image corresponding to segment 1 is "bird.txt" and that the visualized object is displayed on the screen from frame number 100 to frame number 200; at the point in time of frame number 100, the rectangle indicated by the upper left coordinates (100, 150) and the lower right coordinates (180, 200) is the visualized object selection area; and at the point in time of frame number 200, the rectangle indicated by the upper left coordinates (150, 150) and the lower right coordinates (230, 200) is the visualized object selection area.

Next, the method of calculating the hyperlink information 113 will be explained. As described above, in the partial image generating means 15, the three-dimensional partial image is generated using conventional three-dimensional CG technology based on the visualized object information 103, the three-dimensional space shape information 102, and the path information 101. At this time, as shown in FIG. 8, the visualized object is also displayed on the screen as one part of the image of a three-dimensional space. Therefore, in the partial image generating means 15, the partial image 112 is partitioned and generated, and at the same time, the information related to whether or not the visualized object is displayed on the screen in each frame of the partial image and, in the case that it is displayed, information related to the location on the screen where it is to be displayed can be calculated from the contents of the three-dimensional coordinates and the three-dimensional shape model of the visualized object included in the visualized object information 103. This information is sent to the hyperlink information generating means as visualized object selection and area information 105. Moreover, in the visualized object selection and area information 105 that is sent, information related to the visualized object name corresponding to the frame number information at that point in time is included.

Next, in the hyperlink information generating means, the visualized object selection and area information 105 is received item by item, and based on this information, information relating to the starting frame, ending frame, and the position of the visualized object selection area in both frames (that is, the starting point coordinates and the ending point coordinates) is calculated, and furthermore, the hyperlink information 113 is generated by obtaining the corresponding related link information from the visualized object information storing means 13 based on the visualized object name included in the visualized object selection and area information 105.

Here, in the partial image generating means 15, the information first generated in relation to the visualization object is the information related to the presence or absence of a visualized object image to be displayed in each frame, and the information related to position in the case that it is to be displayed. Thus, in order to use this hyperlink information 113, it is necessary to extract the frame number at the point in time the visualized object first appears (that is, the number of the starting frame), extract the frame number at the point in time it last appears (that is, the number of the ending frame), and generate the visualized object selection area corresponding to the image of the visualized object (for example, generating the binding box of the visualized object image). However, the processing for making these hyperlinks 113 can be carried out in the partial image generating means 15 or carried out in the hyperlink information generating means 16.

For example, when implemented in the partial image generating means 15, the starting frame number, which is information that is available after the above-described processing, the final frame number, and the position information of the visualized object selection area at the time of the starting frame (that is, the starting point coordinates in FIG. 3), and the position information of the visualized object selection area at the point in time of the ending frame (that is, the ending point coordinates in FIG. 3) are sent as the visualized object selection and area information 105, and in the hyperlink information generating means 16, this information becomes as-is the hyperlink information 113.

In contrast, when implemented in the hyperlink information generating means 16, the partial image generating means 15, for example, sends the information related to the presence of absence of the display of the visualized object image in each frame and information related to the position in the case that it is displayed as the visualized object selection and area information 105, and the processing for generating the the hyperlink information 113 can be carried out in the hyperlink information generating means 16 by referring to the sequence of information that has been sent.

In addition, as a method that is intermediate to these, one part can be implemented in the partial image generating means 15 and the remainder can be implemented in the hyperlink information generating means 16.

By the above, the space image generating apparatus 1 can generate the partial image 112, the branching information 111, and the hyperlink information 113 corresponding to all segments along the path based on the path information 101, the three-dimensional space shape information 102, the visualized object information 103.

In addition, the above processing can be automatically carried out entirely without human intervention, and in the case that the paths, the three-dimensional space shape, and the visualized object are updated, partial image 112, branching information 111, and hyperlink information 113 that incorporate the updated conditions accordingly can be generated. Furthermore, the generation of this information needs to be carried out only at the locations related to the updated parts of the paths, the three-dimensional space shape, and the visualized objects.

Next, the processing of each part of the space image generating apparatus 2 will be explained in detail. First, the branching information storing means 21 will be explained in detail referring to FIG. 1 and FIG. 4. The branching information storing means 21 temporarily stores the branching information 111 (refer to FIG. 4) generated by the branching information generating means 14, and depending on the branching information selection instructions 130 from the partial image selection means 24, the requested branching information 121 is sent. Here, the content of the branching information 121 is identical to the branching information 111 prior to being stored.

The partial image storing means 22 will be explained in detail referring to FIG. 1 and FIG. 5. The partial image storing means 22 temporarily stores a plurality of partial images generated by the partial image generating means 15, and sends the selected partial images 123 depending on the partial image selection instructions 131 from the partial image link play means 23. The partial images stored in the partial image storing means 22 are partitioned by the sections indicated by the path information 101, and stored. For example, in the case of that the path information in FIG. 5 is used, the partial images are the three partial images corresponding respectively to segment 1, segment 10, and segment 20.

Here, the partial images 123 can be sent using a format in which all are sent at once irrespective of the play state of the partial image link play means 23, or using a format in which the play and timing of the partial image link play means 23 are coordinated, and the partial images are sent in sequence starting with the first one.

In addition, as a method of storing the partial images, methods of storing as movie files (for example, in the AVI format of Microsoft Corporation) in a computer, video disc apparatuses, or various types of image recording apparatuses such as VTR apparatuses can be used. However, in order to implement the present invention effectively, instantaneous response to the partial image selection instructions 131 is necessary, and thus using movie files on a computer and video disc apparatuses, which are superior in terms of random access of the images, is preferable.

The partial image selection means 24 has a function wherein, when the user performs a walk through operation, that is, a path selection operation, via a user operation means 3, at this point in time, the partial image that should be played next is determined by referring to the branching information 121 corresponding to the partial images being played, and sends the partial image switching instruction 122, which is the instruction for switching to this partial image. In addition, when referring to the branching means 121, the branching information selection instruction 130 is carried out by the branching information storing means 21.

The partial image link play means 23 will be explained in detail referring to FIG. 1, FIG. 4, and FIG. 10. The partial image link play means 23 receives from the partial image storing means 22 due to the partial image selection instruction 131 the partial image necessary for the next play depending on the partial image switching instruction 122 from the partial image selection means 24, and sends the partial images before and after switching as the linked play space images 126. Here, the partial image link play means 23 provides a function that smoothly links and plays partial images before and after switching in order to reduce the unnatural feeling a user may experience during the switching of the partial images.

For example, consider the case of switching from the partial image of segment 1 (referred to as partial image A) to the partial image of segment 10 (referred to as partial image B) at the branching point 2 in FIG. 4 and FIG. 10. Here, when a partial image switch instruction 122 that commands switching to partial image B is received at the point in time that frame number 310 of the partial image A is being played, if the play of partial image A is instantaneously suspended and partial image B is switched to and played, the image of point P2 is suddenly switched to from the image of the point near P1' (that is, the point of frame number 310 of partial image A) as shown in FIG. 10, and this can give the user the unnatural feeling that the viewpoint in three-dimensional space is moving discontinuously.

Thus, the partial image link play means 23 has a function wherein the switching of the partial images is not carried out instantaneously even in the case that a partial image switching instruction 122 that commands switching to the partial image B is received at the point in time that frame number 310 of partial image A is being played, and the play of the partial image B begins after the partial image A has played up to the ending frame (here, frame 400).

Thereby, the partial image A and the partial image B are continuously switched at point P1 on the path in FIG. 10, and the feeling of unnaturalness described above at the joint of the partial images can be reliably decreased. At this time, the value of the ending frame of the partial image A can be known by referring to the partial image 121 from the branching information storing means 21, and the frame number of the partial image A currently being played can be known as information internal to the partial image link play means 23 (which frame was played can be calculated from the beginning of partial image A).

Furthermore, when switching from partial image A to partial image B, if the play of the partial image B cannot be started after the partial image A has played up to the ending frame in the case that the required time until the partial image B is received from the partial image storing means 23 exceeds a predetermined amount of time, a condition may occur in which no image is present (a blank state) in the space image 126.

In this type of case, in the partial image link play means 23, the number of frames in the partial image A up to the branching point is calculated by referring to the branching information 121, and the occurrence of a blank state can be prevented or the length of time of the blank state can be shortened by making the play speed of the partial image A during this time slower than normal.

Moreover, as a means of decreasing the sense of unnaturalness during the switching of images, the image effects of fade out and fade in, which are widely used in image switchers, etc., can be used, and these are effective methods when two originally unrelated images are linked and played. However, the plurality of images stored in the partial image storing means 22 according to the present invention, which are originally images that are walked through on a continuous path, are partitioned at branching points, and in this case, rather than fade out and fade in, the method described above, that is, the method wherein irrespective of the timing at which the partial image switching instruction is received, linkage always takes place at the last frame of the partial image, is effective.

According to the above, the space image play apparatus 2 temporarily stores the partial image 112 and the branching information 11 I generated in the above-described space image generating apparatus 1, and while referring to this information, depending on the path selection operation information 125, which depends on the walk through operation of the user, a plurality of partial images are linked and played without an unnatural feeling, and thereby allows the user to walk through the desired paths from among a plurality of paths. The processing in the space image play apparatus 2 can be realized by a play function of the movie file provided in a general-use computer as a calculation function, and use of high cost apparatuses such as hardware dedicated to three-dimensional CG is unnecessary.

A first effect of the present invention is that even though hardware dedicated to three-dimensional CG is not used, an automatic walk through image and a partial image having an automatically generated movie format are used, and in addition to the user being able to perform a walk through selectively, in the case that the three-dimensional space information and the walk through paths are modified, these can be automatically incorporated into the partial image.

Furthermore, because the walk through movie is partitioned into partial images before being used, in the case that the three-dimensional space information and the walk through paths are modified, only the partial images connected with the modifications are regenerated rather than all of the partial images. Thereby, compared to the conventional technology, the number of operations during the walk through image generation and during image updating can be dramatically deceased.

A second effect of the present invention is that the visualized object included in the image of the movie file and the hyperlink information indicating the connection with related information are automatically generated. This is because the invention is provided with a means that automatically generates the information related to position on the screen in the case that a visualized object is included in the displayed image in each frame when the walk through image that includes a visualized object is automatically generated.

What is claimed is:

1. An information visualization system comprising:

a partial image generating means that generates three-dimensional computer graphic images along a walk through path based on walk through path information that includes three-dimensional space information and branching information, converts the three-dimensional computer graphic images into a walk through movie image having a movie format, partitions the walk through movie image at branching points of the walk through path, and generates a plurality of partial images in movie format;

a branching information generating means that generates the branching information related to branching connections between each partial image generated by the partial image generating means;

a branching information storing means that stores the branching information generated by the branching information generating means;

a partial image storing means that stores the partial images generated by said partial image generating means and outputs particular partial images depending on partial image selection instructions;

a partial image selection means that sends partial image switching instructions for switching partial images stored in the partial image storing means according to a path selection operation of the user; and a partial image link play means that sends said partial image selection instructions according to partial image switching instructions received from the partial image selecting means and that requires the particular partial storage images output from said partial image storage means and at the same time links and plays said particular partial image.

2. An information visualization system according to claim 1, wherein said information visualization system further comprising a hyperlink information generating device, in which contents are displayed at a certain position in a certain scene in the respective partial images based on the three-dimensional space information of the visualized contents in a three-dimensional space, three-dimensional position information, and link information to the information related to said contents, and furthermore, hyperlink information is generated that indicates related information is to be presented to the user when the user selects the contents.

* * * * *